US005939811A

United States Patent [19]
Enomoto et al.

[11] Patent Number: 5,939,811
[45] **Date of Patent: *Aug. 17, 1999**

[54] ELECTROMAGNETIC DEVICE WITH STATOR DISPLACEMENT REGULATION

[75] Inventors: Shigeiku Enomoto, Hoi-gun; Moriyasu Gotoh, Toyohashi; Koji Takasu, Hekinan, all of Japan

[73] Assignees: Denso Corporation, Kariya; Nippon Soken, Inc., Nishio, both of Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/815,453

[22] Filed: Mar. 11, 1997

[30] Foreign Application Priority Data

| | | | |
|---|---|---|---|
| Mar. 11, 1996 | [JP] | Japan | 8-053149 |
| Dec. 20, 1996 | [JP] | Japan | 8-341729 |

[51] Int. Cl.[6] H02K 1/18; H02K 1/06; F02M 51/06

[52] U.S. Cl. 310/216; 310/217; 310/14; 239/585.1; 239/585.3; 251/129.02; 251/129.15; 251/129.21

[58] Field of Search 310/216, 217, 310/68 B, 12, 14; 239/585.1, 585.3; 335/297, 251, 281; 29/602.1, 607, 609, 596; 192/84.1, 84.9; 251/129.15, 129.21, 129.02

[56] References Cited

U.S. PATENT DOCUMENTS

| | | | |
|---|---|---|---|
| 3,036,247 | 5/1962 | Kumm et al. | 310/216 |
| 3,205,826 | 9/1965 | De Stephani | 103/53 |
| 4,041,541 | 8/1977 | Frossard et al. | 361/13 C |
| 4,631,809 | 12/1986 | Yokoi | 29/607 |
| 4,646,976 | 3/1987 | Rembold et al. | 239/585 |
| 5,183,209 | 2/1993 | Ricco et al. | 239/585.1 |
| 5,503,364 | 4/1996 | Enomoto et al. | 251/129.02 |

FOREIGN PATENT DOCUMENTS

| | | | |
|---|---|---|---|
| 4-365305 | 12/1992 | European Pat. Off. . | |
| 1 528 470 | 10/1968 | France | 310/216 |
| 2-98905 | 4/1990 | Japan . | |
| 3-125086 | 5/1991 | Japan . | |
| 6-176921 | 6/1994 | Japan . | |
| 8-28736 | 2/1996 | Japan . | |
| 8-288164 | 11/1996 | Japan . | |

OTHER PUBLICATIONS

Patent Abstracts of Japan, vol. 15, No. 239 (M–1149) May 1991 re JP 03–125086.
Patent Abstracts of Japan, vol. 17, No. 241 (E–1364) Dec. 1992 re JP 04–365305.

*Primary Examiner*—Clayton LaBalle
*Assistant Examiner*—Karl Eizo Tamui
*Attorney, Agent, or Firm*—Pillsbury Madison & Sutro LLP

[57] ABSTRACT

An electromagnetic device includes a solenoid stator comprised of a plurality of magnetic plates stacked spirally and regulated to prevent displacement. The stator is constructed by spirally disposing around its central axis a plurality of magnetic plates each having a uniform thickness and being bent in a curved shape. A support body of the device is so assembled to the stator as to abut its bottom face and a through hole. The support body has a disk part having an outer diameter generally corresponding to that of the stator and a cylindrical part extending upwardly from the central part of the disk part. The top end part of the cylindrical part is fixedly joined to the stator by laser welding. A push rod coupled with an armature is disposed slidably in a hole of the support body. The bottom face of a cap housing abuts the peripheral part of the top face of the stator to press the peripheral part from the upperside.

8 Claims, 10 Drawing Sheets

ELECTROMAGNETIC DEVICE WITH STATOR DISPLACEMENT REGULATION

BACKGROUND OF THE INVENTION

1. Field of the Invention

The present invention relates to an electromagnetic device which has a stator constructed by a plurality of spirally stacked magnetic plates.

2. Description of Related Art

It is conventionally proposed by Japanese Laid-open Patent Publication No. 4-365305, for instance, to construct a solenoid stator for an electromagnetic device by stacking spirally a plurality of magnetic plates having a uniform plate thickness. This electromagnetic device is shown in FIG. 14. In this device, a coil 6 is wound in a coil insertion groove 6 of a stator 4 and a push rod 11 coupled with an armature 12 is disposed slidably movably in a through hole 7 formed at the central part of the stator 4. According to this construction, when the coil 6 is energized, the armature 12 is attracted toward the magnetic pole face (upper or top face in the figure) of the stator 4 so that a valve body (not shown) coupled with the bottom end of the push rod 45 opens and closes.

According to this conventional device, the stator 4 and the armature 12 are likely to attract each other by the magnetic force during the coil energization, causing such drawbacks as when the stator 4 rises and is displaced. That is, in the case of the stator constructed by stacking numerous magnetic plates spirally, the central part of the stator is not supported sufficiently and hence the central part tends to rise causing rising displacement. Such a rising of the stator central part causes the air gap provided between the stator and the armature to decrease, thus affecting the performance of the electromagnetic device or the like.

It is also proposed in Japanese Laid-open Patent Publication No. 3-125086 to regulate the rising of a solenoid stator for an electromagnetic device by a stator support structure for an electromagnetic device. According to this structure, a stator is constructed by stacking E-shaped magnetic plates and pressing the peripheral end face of the stator by a support member. AS shown in FIG. 15 in more detail, the stator 4 has thin magnetic plates 51 stacked at both right and left positions and a thick plate 52 disposed centrally so that the stator 4 is shaped in a generally cylindrical form as a whole. The plate 52 is formed a through hole 7 for insertion of a push rod.

This conventional device has, as shown in FIGS. 16(*a*) and 16(*b*), a coil 6, armature 12 and the like with the stator 4. As shown in the figures, an annular support member 54 is mounted on the upper face of the stator 4 thereby to press the longitudinal end (both end parts of all the magnetic plates 51 and 52). Although the stator 4 and the armature 12 operate to attract each other during energization of the coil 6 also in this construction, the stator 4 is regulated from being displaced by the support member 54 which presses the stator 4.

SUMMARY OF THE INVENTION

The present invention has an object of providing an electromagnetic device which has a solenoid stator comprised of a plurality of magnetic plates stacked spirally and regulated to prevent displacement.

For attaining this object, a first position regulating member is provided for regulating an axial position of magnetic plates at the central side of a stator and a second position regulating member is provided for regulating an axial position of the magnetic plates at the outer peripheral side of the stator. The first and the second position regulating members cooperatively regulate both the central side and the outer peripheral side of the stator axially so that the magnetic plates are prevented from rising thereby to assuredly prevent the deformation of the stator.

Preferably, the first position regulating member has an abutment part abutting an opposite face of a magnetic pole face opposing an armature and also a position regulating part for regulating, in a position from the abutment part to a through hole at the stator central part, the axial position of the magnetic plates. The position regulating part particularly regulates the rising of the magnetic plates at the inner end side thereby to prevent the deformation of the stator more assuredly.

Preferably, the first position regulating member is in abutment with an opposite face of a magnetic pole face opposing an armature and is welded to the magnetic plates within the through hole at the stator central part.

Preferably, the second position regulating member is in a ring shape and presses a peripheral end part relative to a magnetic pole face opposing an armature.

More preferably, the position regulating part has a cylindrical body or an axial body welded to an end face of the magnetic plates within the through hole of the stator, or the position regulating part has an engagement part engaged with an end face of the magnetic plates within the through hole of the stator.

DETAILED DESCRIPTION OF THE PRESENTLY PREFERRED EMBODIMENT

Figure 1:
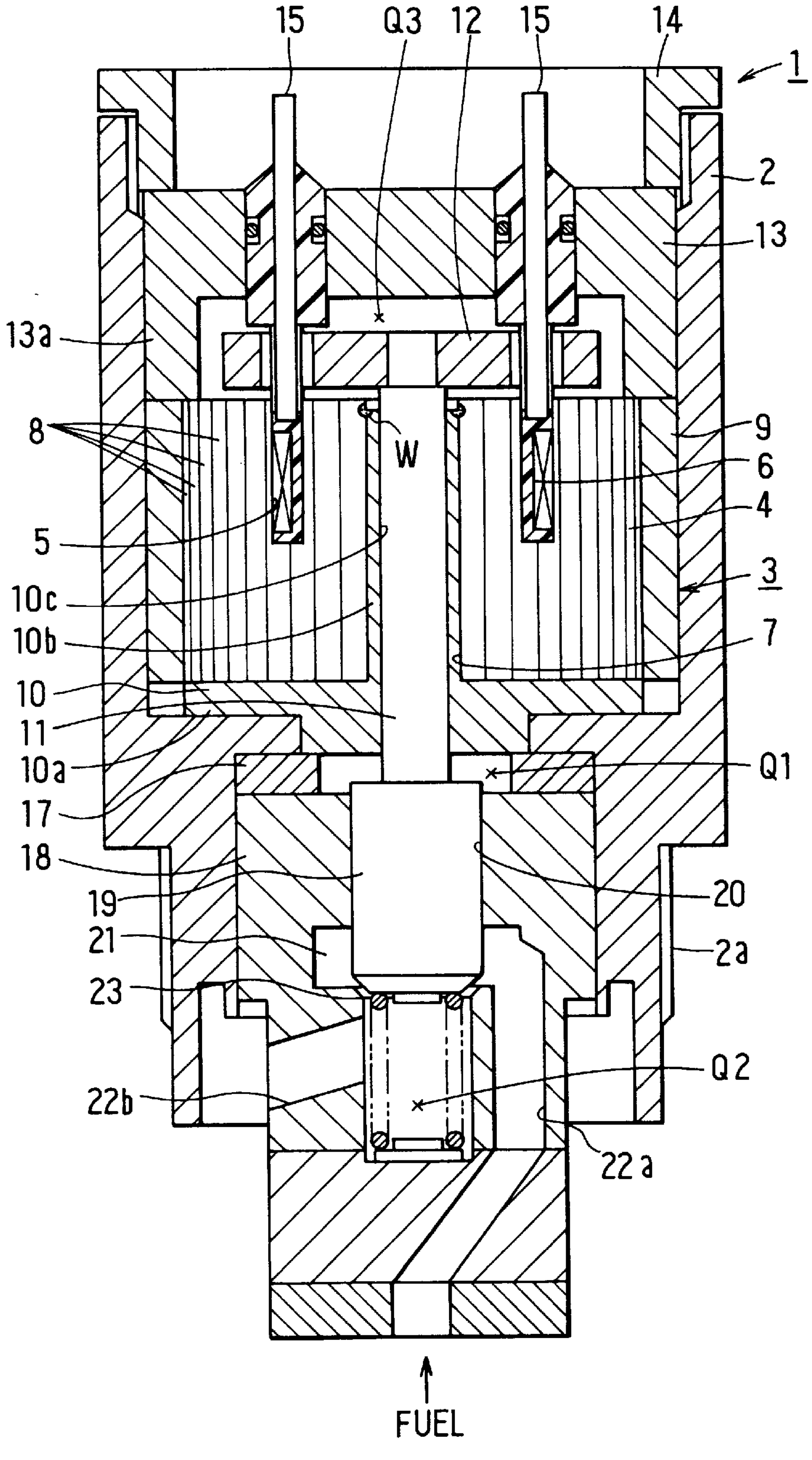
FIG. 1 is a cross sectional view showing a construction of an electromagnetic device according to a first embodiment of the present invention.

The present invention is described in detail with reference to the accompanying drawings in which the same reference numerals are used to designate the same or like parts throuout the various embodiments.

First Embodiment

In the first embodiment shown in FIG. 1, an electromagnetic device 1 is used as an electromagnetically-operated fuel spill valve for the fuel injection pump of a diesel engine so that the valve operates as a normally-open type valve. That is, during the normal operation in which a solenoid coil is deenergized, a valve body is kept to open a fuel passage by a biasing force of a biasing spring. With the solenoid coil being energized, the valve body moves against the biasing force of the biasing member to close the fuel passage.

In the electromagnetic device 1, a solenoid housing 2 is shaped generally cylindrically, and there is formed a thread 2*a* at the bottom outer periphery thereof for attaching the electromagnetic valve to a fuel injection pump not shown. A stator assembly 3 is fitted inside the solenoid housing 2. The stator assembly 3 has a solenoid stator (simply referred to as stator hereunder) 4. The stator 4 forms an annular coil insertion groove 5 opening upwardly in the figure so that a coil 6 wound in the insertion groove 5. The stator 4 is also forms a through hole 7 passing axially centrally (in updown direction in the figure).

Figure 2:
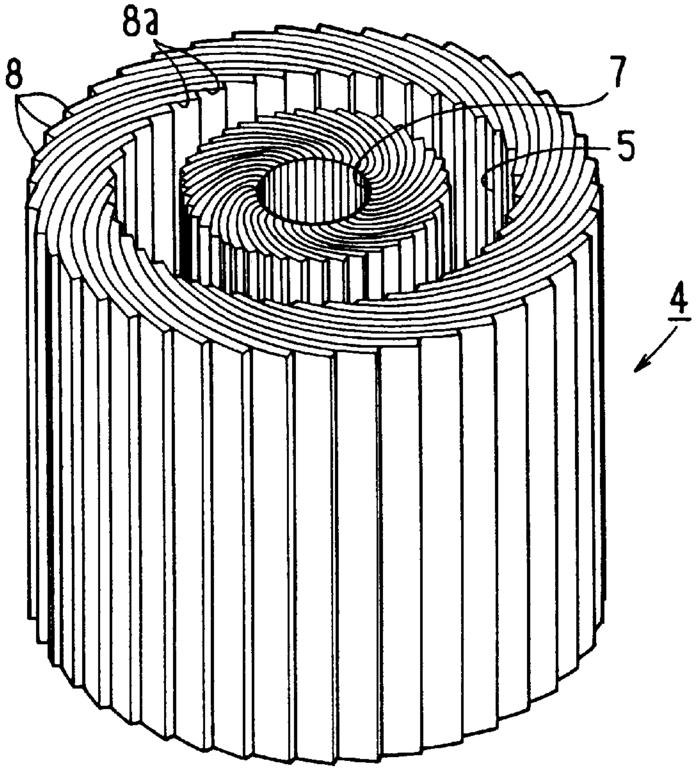
FIG. 2 is a perspective view showing a construction of a stator used in the first embodiment.
Figure 3:
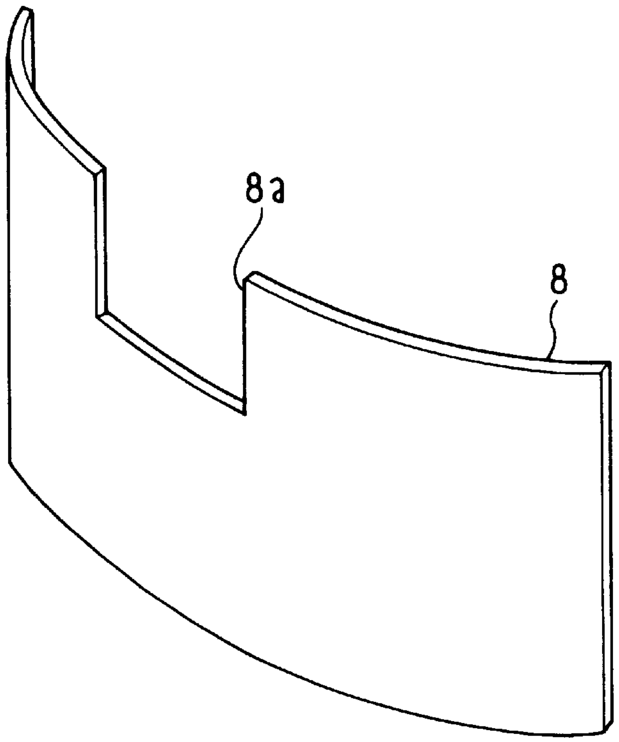
FIG. 3 is a perspective view showing a shape of a magnetic plate used in the first embodiment.

As shown in FIG. 2, the stator 4 has a stacked construction of a number of magnetic plates 8. As shown in FIG. 3, a silicon steel plate of uniform thickness is used for the plate 8. The silicon steel plate 8 is press-punched to form a rectangular cut-out or recess 8*a* and is bent in a curved shape longitudinally. Each plate 8 is disposed spirally around the central axis of the stator 4 by the aid of a certain jig or the like and its outer periphery is fixed circularly so that the stator 4 is assembled generally cylindrically as shown in FIG. 2. By this assembling, the coil insertion groove 5 is formed by the recess 8*a* of the plate 8.

As shown in FIG. 1 further, a ring 9 is fitted around the outer periphery of the stator 4. At the time of fitting the stator 4 with the ring 9, the spirally formed stator 4 is press-inserted against the inner peripheral face of the ring 9.

Figure 4:
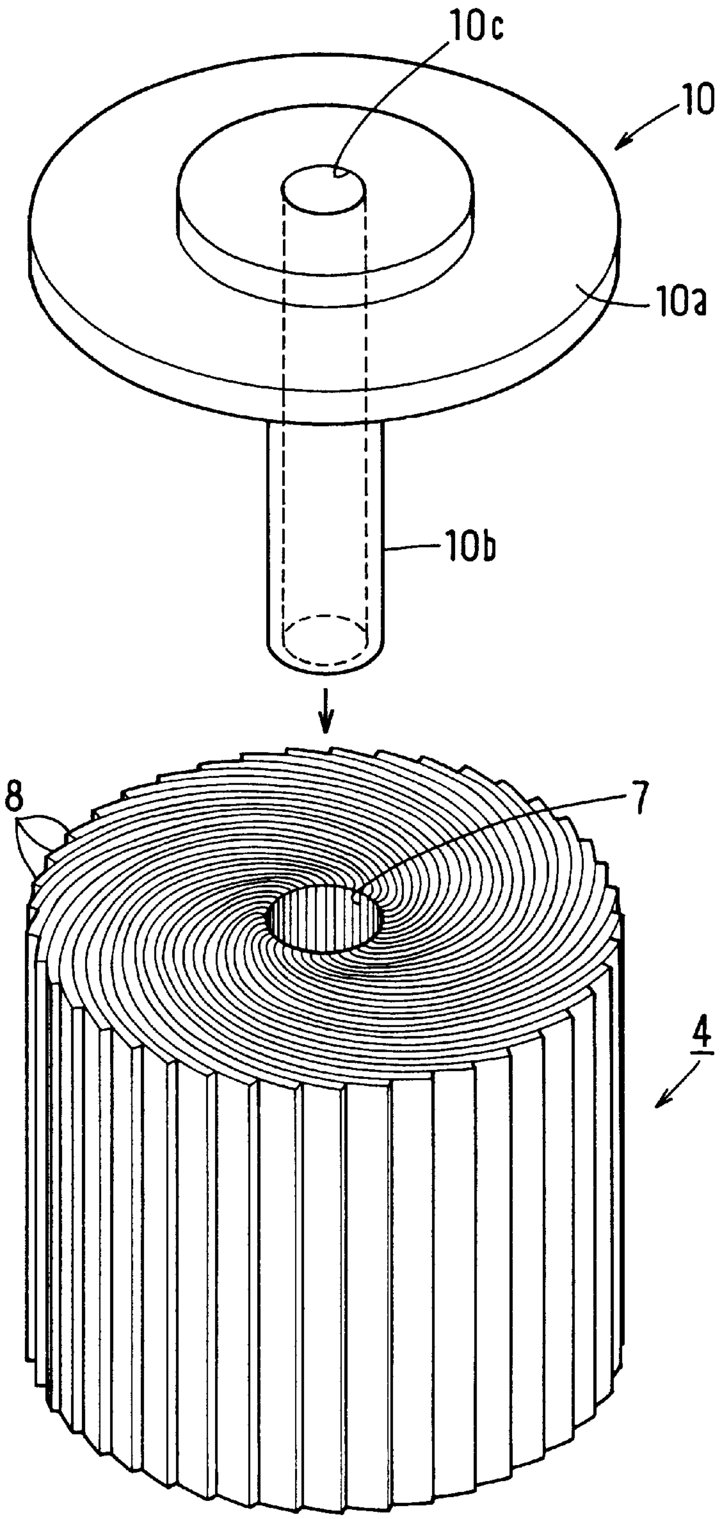
FIG. 4 is a perspective view of the stator and a support body before assembling.

A support body 10 is assembled with the stator 4 in such a manner to abut the bottom face and the through hole 7 of the stator 4. The support body 10 is generally in a T-shape in cross section, and has a circular disk part 10*a* having generally the same outer diameter as that of the stator 4 and a cylindrical part 10*b* extending upwardly from the central part of the disk part 10*a*. A hole 10*c* is formed centrally in the support body 10. As shown in FIG. 4, the cylindrical part 10*b* of the support body 10 is press-fitted into the through hole 7 of the stator 4. In press-fitting the support body 10, the ring 9 may be fitted around the stator 4 after the support body 10 has been press-fitted into the stator 4, or alternatively the support body 10 may be press-fitted with the stator 4 with the ring 9 fitted around the stator 4.

As shown in FIG. 1, the length of the cylindrical part 10*b* of the support body 10 is slightly shorter than the height (axial length) of the stator 4. The top end part of the cylindrical part 10*b* is fixed to the stator 4, i.e., to all the radially inner peripheral end of the magnetic plates 8*a*, by laser welding. The welded part is indicated by W in FIG. 1.

A push rod 11 is positioned in the hole 10*c* of the support body 10 axially slidably (in an up-down direction in the figure). An armature 12 is coupled with the top end of the push rod 11. The armature 12 is so arranged as to be attracted toward the top face (magnetic pole face) of the stator 4 by the magnetic force generated at the time of energization of the coil 6.

A cap housing 13 is mounted above the armature 12 in a manner to tightly abut the inner peripheral face of the solenoid housing 2. The cap housing 13 has an annular peripheral part 13*a* extending axially downwardly. The bottom face of the annular peripheral part 13*a* is in abutment with both the top peripheral end part of the stator 4 and the top end face of the ring 9. With a locking nut 14 threaded into the top end part of the solenoid housing 2, the cap housing 13 is fixed in position and the top peripheral end face of the stator and the ring 9 are pressed downward via the cylindrical part 13*a* of the cap housing 13.

Signal input terminals 15 are fixed in the cap housing 13 by resin molding to receive electric signals supplied from the outside. The coil 6 is electrically connected to the signal input terminals 15 through lead wires not shown.

A valve housing 18 is assembled through a plate 17 at the bottom part of the solenoid housing 2. A valve body 19 is disposed in the valve housing 18 to open and close a fuel passage. The valve housing 18 is formed a slide hole 20 to hold the valve body 19 slidably. The slide hole 20 is in communication with a high pressure fuel chamber 21 formed annularly. Fuel passages 22*a* and 22*b* are formed in the valve housing 18 in communication with the high pressure fuel chamber 21. The valve body 19 is coupled with the bottom end of the push rod 11 and is normally biased to open (in the upper direction in the figure) by a compression coil spring 23.

It is to be noted that, because the valve body 19 is required to operate sufficiently fast in the electromagnetic valve 1, an upper chamber Q1 and a lower chamber Q2 around the valve body 19 as well as an armature chamber Q3 are maintained under the same pressure (fuel feed pressure supplied to a fuel injection pump, for instance) so that fast response characteristics of the valve body 19 is assured.

Figure 5:
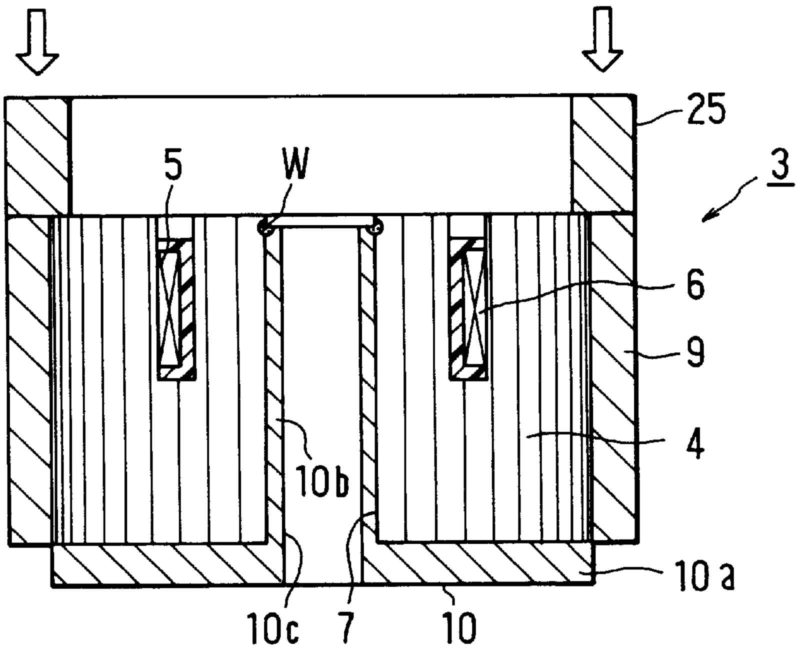
FIG. 5 is a cross sectional view showing assembling process of a stator assembly.
Figure 6:
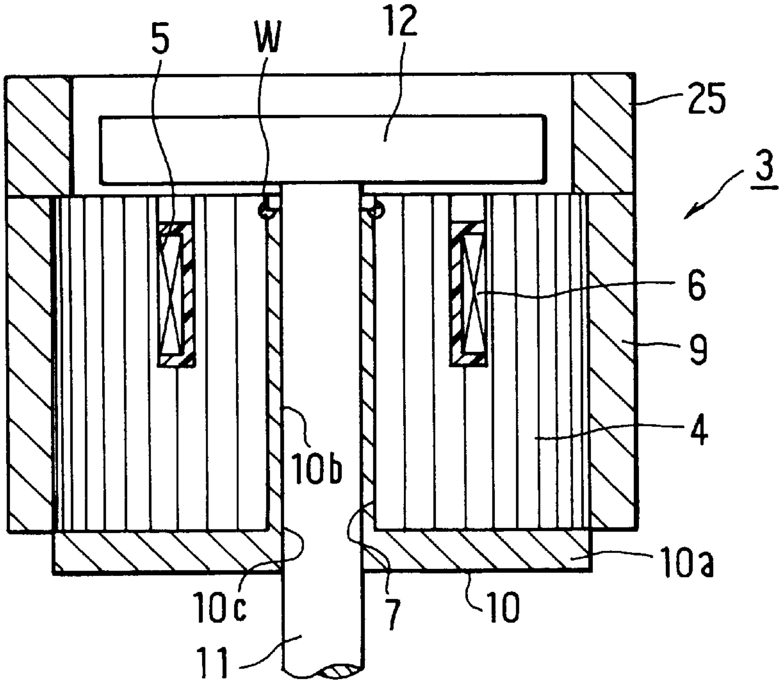
FIG. 6 is a cross sectional view showing the assembling process of the stator assembly.

The stator assembly 3 is assembled as shown in FIGS. 5 and 6 (the bottom face of the support body 10 is shown as a flat face in each figure for brevity). As shown in FIG. 5, the ring 9 is fitted around the radial outer periphery of the stator 4 and the support body 10 is fitted with the through hole 7 of the stator 4 from the underside. The coil 6 is molded in the coil insertion groove 5 of the stator 4. With an annular jig 25 being kept pressed on the top peripheral face part of the stator 4 and the top face of the ring 9, the top face of the cylindrical part 10*b* of the support body 10 and the inner peripheral faces (all end faces of the magnetic plates 8 exposed in the through hole 7) of the stator 4 are laser-welded to each other at welding part W1. In this instance, the jig 25 is used in place of the cap housing 13 shown in FIG. 1. By the laser-welding, all the magnetic plates 8 forming the stator 4 are welded to the support body 10.

After the completion of welding the stator 4 and the support body 10 by the laser-welding, an integral body of the push rod 11 and the armature 12 is inserted into the hole 10*c* of the support body 10 from the upperside so that the magnetic pole faces of the armature 12 and the stator 4 face each other.

The electromagnetic device 1 shown in FIG. 1 operates as follows. As long as the coil 6 is in the deenergized condition (shown in the figure), a certain predetermined air gap is provided between the top face of the stator 4 and the bottom face of the armature 12, and the valve body 19 coupled to the bottom part of the push rod 11 is maintained at the predetermined open position. At this time, the top part of the armature 12 abuts a stopper, not shown, so that the valve open position of the valve body 19 is maintained. Thus, the fuel passages 22*a* and 22*b* are kept in communication with each other through the high pressure fuel chamber 21.

When the electric signal is applied to the signal input terminals 15 from the outside to energize the coil 6, the armature 12 is attracted toward the stator 4 and the air gap between the top face of the stator 4 and the bottom face of the armature 12 is reduced. The valve body 19 moves to the valve closure position in response to the movement of the armature 12 so that the communication between the fuel passages 22*a* and 22*b* is interrupted. At the time of energization of the coil 6, the stator 4 (magnetic plates 8) receives in the upward direction a pulling force resulting from the attraction between the stator 4 and the armature 12. The stator 4, however, does not rise nor is displaced, because the radially outer peripheral part of the stator 4 is pressed downward by the cap housing 13 and the central part of the stator 4 is fixedly supported by the cylindrical part 10*b* of the support body 10.

In addition to attaining regulation of the displacement of the stator 4, the present embodiment attains other advantages as follows.

(a) The locking nut 14 is threaded into the top end part of the solenoid housing 2 so that the cap housing 13 is pressed downwardly (toward the bottom in FIG. 1) by tightening. As a result, the peripheral part of the stator 4 can be fixedly supported simply but assuredly.

(b) The ring 9 is assembled around the outer periphery of the stator 4. Therefore, the stator 4 (magnetic plates 8) constructed by spiral stacking is prevented from breaking its generally cylindrical shape in the direction of outer periphery.

By these advantages (*a*) and (*b*), both the central side and the outer peripheral side of the stator 4 are position-regulated in the stator axial direction. As a result, the rising of the magnetic plates 8 can be regulated over the entire range and hence the deformation of the stator 4 can be prevented assuredly.

(c) The stator 4 is constructed by stacking a number of magnetic plates 8 spirally. If silicon steel plates (directional type or nondirectional type) having a good soft magnetic characteristics are used, the stator 4 can have a high maximum magnetic flux density and a high attraction force.

(d) Because the displacement of the stator can be regulated as described above, the performance of the electromagnetic device 1 with the stator 4 can be improved. That is, the air gap between the magnetic pole faces of the armature 12 and the stator 4 and the lift of the valve body 19 reduces responsively, when the stator 4 is displaced. In this instance, the communication between the fuel passages 22*a* and 22*b* in the electromagnetic valve 1 cannot be interrupted completely, causing degradation of the performance of the electromagnetic device 1 used as a valve unit. According to the present embodiment, however, such a drawback will not occur because the displacement of the stator 4 is regulated. Thus, the performance of the electromagnetic device 1 used as a valve unit can be maintained.

Second Embodiment

Figure 7:
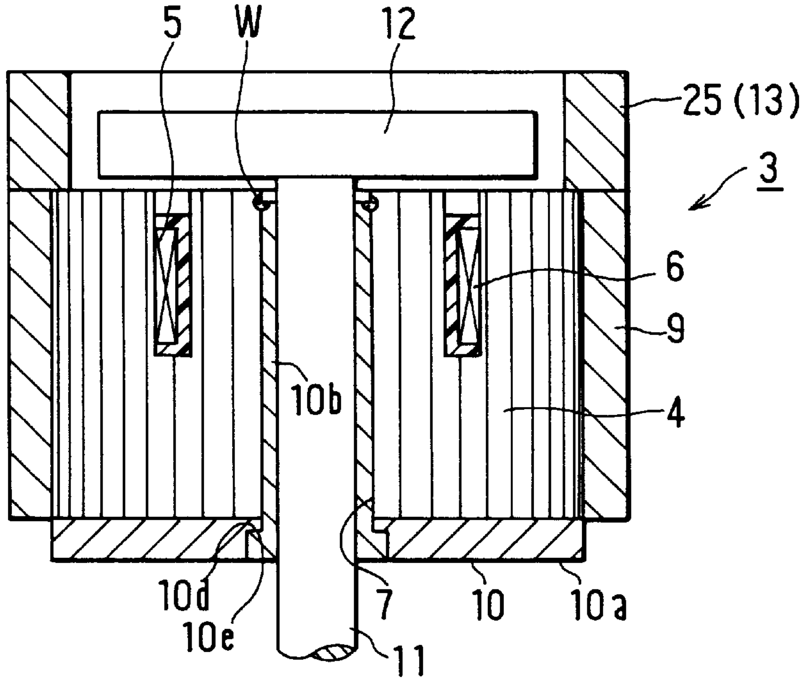
FIG. 7 is a cross sectional view showing a construction of a stator assembly according to a second embodiment.

In FIG. 7, the support body 10 as the first position regulating member is constructed by the disk part 10*a* and the cylindrical part 10*b* manufactured separately from each other. Although the disk part 10*a* and the cylindrical part 10*b* are separated into two parts, the two parts 10*a* and 10*b* are engaged into an integral body by respective stepped portions 10*d* and 10*e*, and the axial top end part of the cylindrical part 1*b* is welded to the stator 4 as indicated by W. At the time of welding by the laser welder, the top peripheral face part of the stator 4 and the top face of the ring 9 are pressed by the jig 25 which corresponds to the cap housing 13 of the electromagnetic device.

According to this embodiment, the following advantages are provided in addition to those provided in the first embodiment. That is, with the support body 10 being constructed by the disk part 10*a* and the cylindrical part 10*b* separately manufactured, material machining is eased and other workability in the various processes such as drilling is improved in comparison with the first embodiment in which the T-shaped support body 10 is integrally manufactured. Further, since the part to be chipped by the machining is reduced, the material cost is reduced and cost reduction is attained.

Third Embodiment

Figure 8:
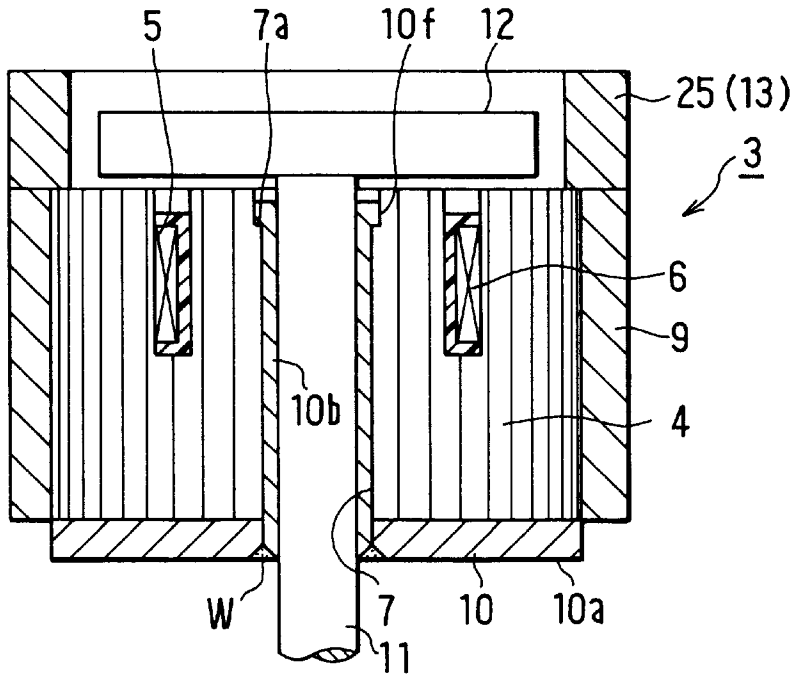
FIG. 8 is a cross sectional view showing a construction of a stator assembly according to a third embodiment.

In FIG. 8, the support body 10 as the first position regulating member is constructed by the disk part 10*a* and the cylindrical part 10*b* manufactured separately as in the second embodiment. A stepped part 7*a* is formed on the top end of the through hole 7 of the stator 4 and a radially enlarged part 10*f* is formed on the top end of the cylindrical part 10*b* of the support body 10 in correspondence with the stepped part 7*a*. After the cylindrical part 10*b* is inserted into the through hole 7, the bottom end of the cylindrical part 10*b* and the bottom face of the disk part 10*a* are welded by the laser welder so that those parts 10*a* and 10*b* are integrated at the bottom as indicated W. At the time of welding by the laser welder, the top peripheral face part of the stator 4 and the top face of the ring 9 are pressed by the jig 25 which corresponds to the cap housing 13 of the electromagnetic device.

According to the present embodiment, in addition to the advantages provided in the first embodiment, advantages of machining simplification and cost reduction can be also provided as described in the second embodiment.

Fourth Embodiment

Figure 9:
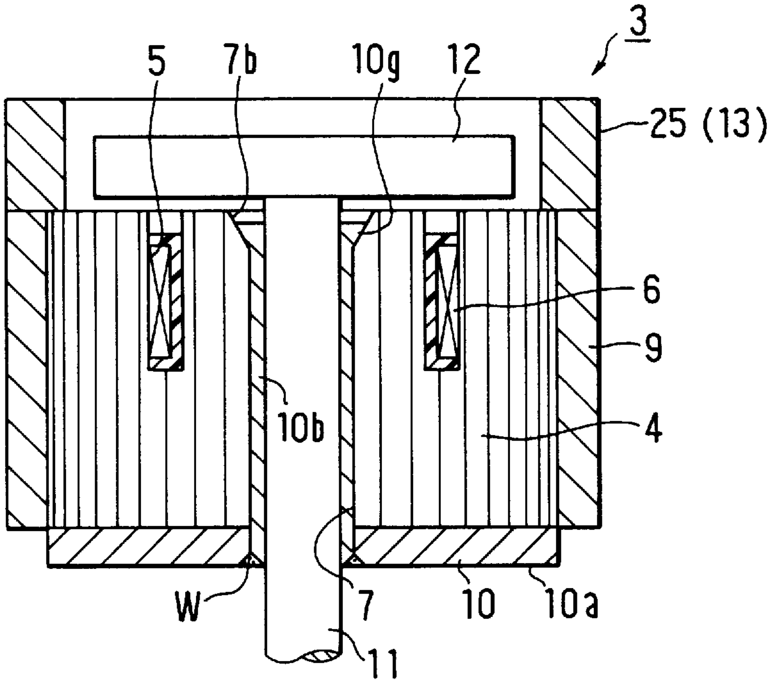
FIG. 9 is a cross sectional view showing a construction of a stator assembly according to a fourth embodiment.

In FIG. 9, the support body 10 as the first position regulating member is constructed by the disk part 10*a* and the cylindrical part 10*b* manufactured separately as in the first and second embodiments. A tapered face 7*b* is formed on the top end of the through hole 7 of the stator 4 and a conical part 10*g* is formed on the top end of the cylindrical part 10*b* of the support body 10 in correspondence with the tapered face 7*b*. with the cylindrical part 10*b* being inserted into the through hole 7, the bottom end of the cylindrical part 10*b* and the bottom face of the disk part 10*a* are welded by the laser welder so that those parts 10*a* and 10*b* are integrated at the welded part indicated by W.

According to the present embodiment, in addition to the advantages of the first embodiment, advantages of machining simplification and cost reduction can be also provided as described in the second embodiment.

Fifth Embodiment

Figure 10A:
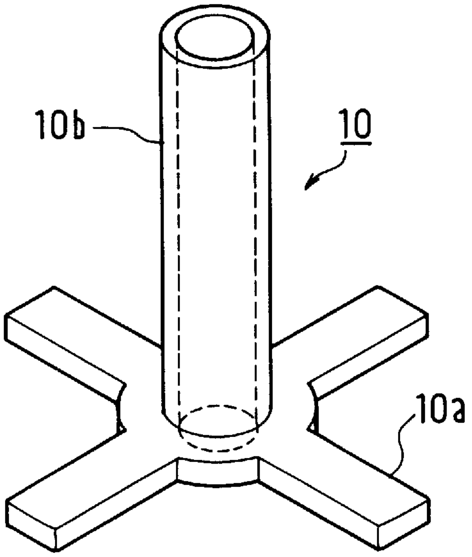
FIG. 10 is a perspective view showing a shape of a support body according to a fifth embodiment.
Figure 10B:
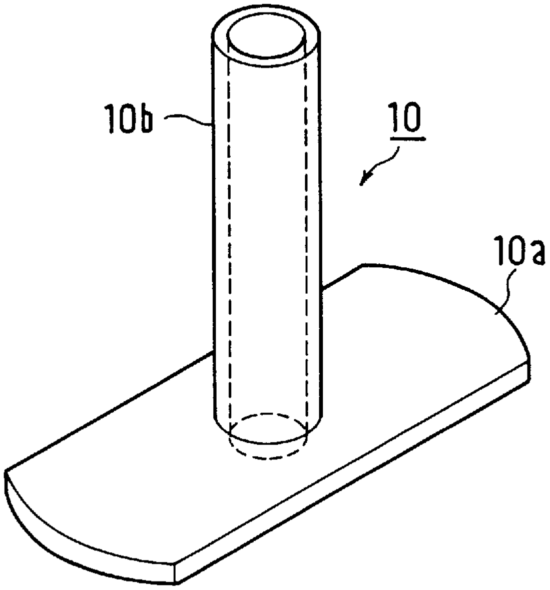

In FIG. 10(*a*), the support body 33 as the first position regulating member is constructed by a bottom part 10*a* formed in a generally cross-shape and a cylindrical part 10*b* raised vertically from the central part of the bottom part 10*a*. As shown in FIG. 10(*b*), the bottom part 10*a* may be formed in an elongated plate shape. The cylindrical part 10*b* of the support body 10 is inserted from the underside of the stator 4 and the top end of the cylindrical part 10*b* is welded as in the first embodiment. In this embodiment, the bottom part 10*a* which abuts the bottom face of the stator 4 may be changed to any shape as desired. It may be may be changed to three lateral extensions or may be formed in a polygonal shape.

In this embodiment, the bottom part 10*a* and the cylindrical part 10*b* may be manufactured integrally or separately. As described in each of the foregoing embodiments, the support body 10 may be constructed by welding two separate members.

Sixth Embodiment

Figure 11:
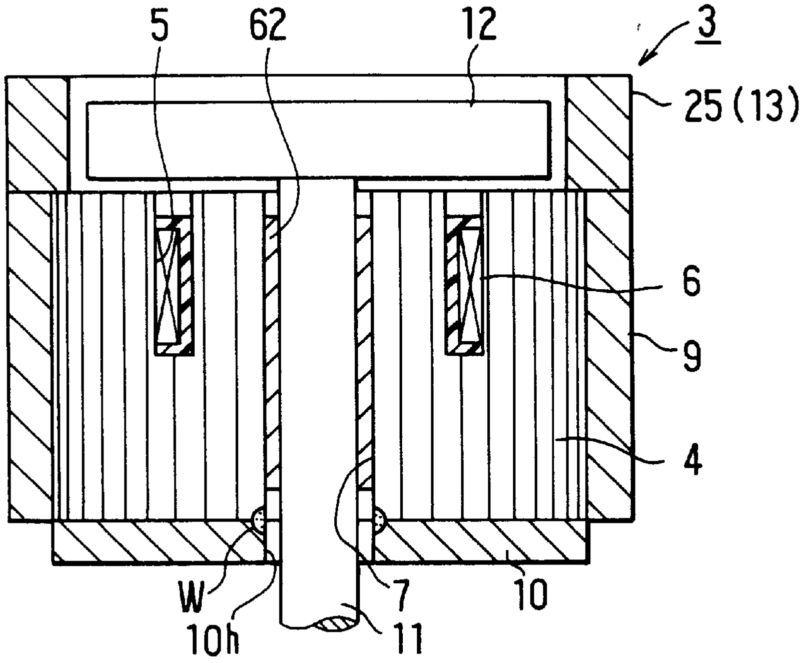
FIG. 11 is a cross sectional view showing a construction of a stator assembly according to a sixth embodiment.

In FIG. 11, The support body 10 as the first position regulating member is formed in the disk shape and assembled to abut the bottom face of the stator 4. The support body 10 forms at the central part thereof a hole 10*h* having the same diameter as the through hole 7 of the stator 4. A bushing 62 is fitted in the through hole 7 of the stator 4 and the ring 9 is fitted around the outer periphery of the stator 4. The boundary between the through hole 7 and the hole 61*a* is welded by the laser welder as indicated by W with the bottom face of the stator 4 and the support body 10 being in contact with each other so that these members 4 and 10 are integrated. At the time of welding by the laser welder, for instance, the top peripheral face part of the stator 4 and the top face of the ring 9 are pressed by the jig 25 which corresponds to the cap housing 13 of the electromagnetic device 1.

Figure 12:
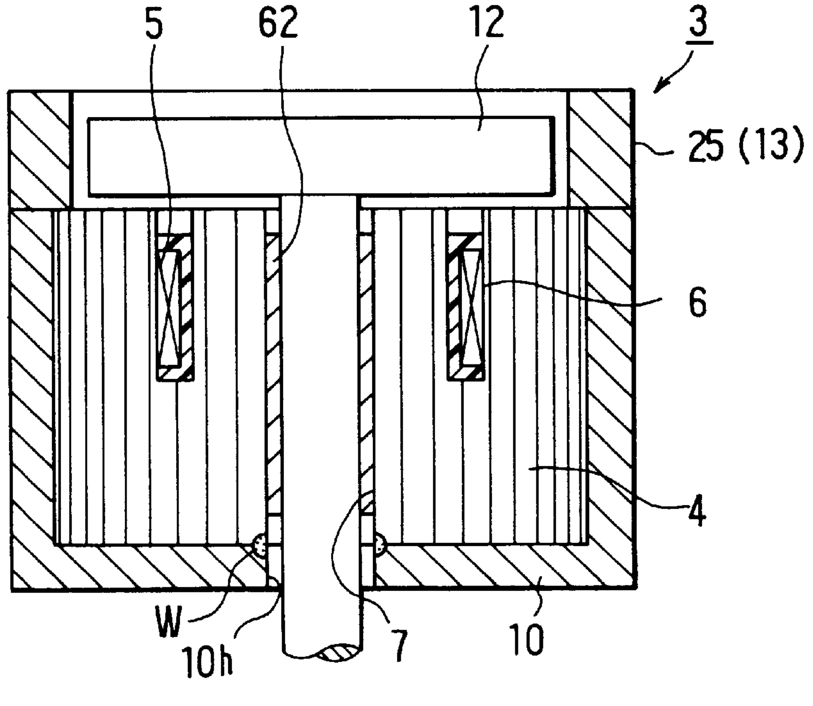
FIG. 12 is a cross sectional view showing the construction of the stator assembly according to the sixth embodiment.

As shown in FIG. 12, on the contrary, the support body 10 may be constructed in a cup shape by integrating the support body 10 and the ring 9 shown in FIG. 1. The support body 10 is formed at the central part thereof the hole 10*h* having the same diameter as the through hole 7 of the stator 4. The boundary between the through hole 7 and the hole 10*h* is welded by the laser welder as indicated by W with the bottom face of the stator 4 and the support body 10 being in contact with each other.

According to the construction shown in FIGS. 11 and 12, the similar advantages can be provided as in each of the foregoing embodiments. That is, because all the radially inner ends of the magnetic plates 8 which form the stator 4 are welded to the support body 10 at the welded part W, no such disadvantages as the rising and displacement of the stator 4 will occur.

Seventh Embodiment

Figure 13:
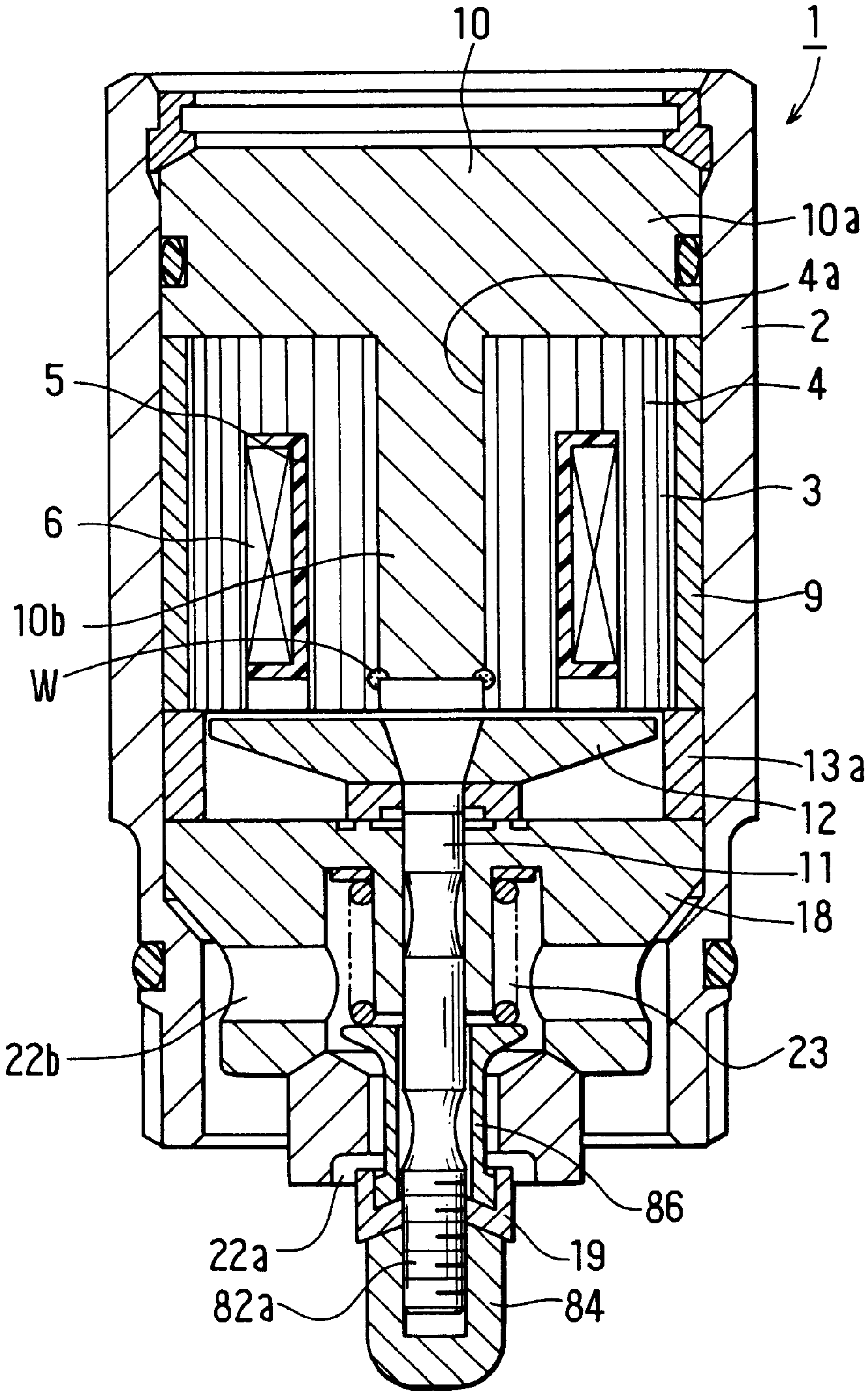
FIG. 13 is a cross sectional view showing an electromagnetic device according to a seventh embodiment.
Figure 14:
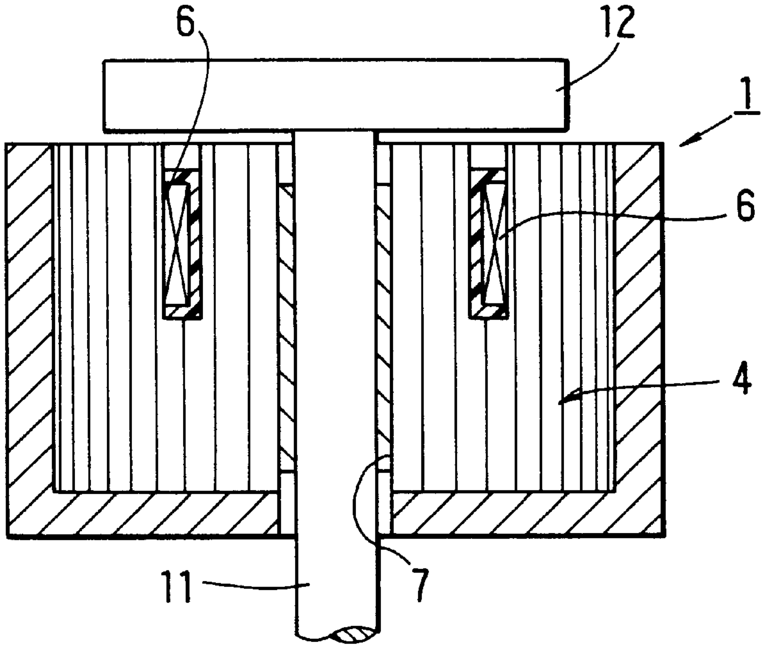
FIG. 14 PRIOR ART
FIG. 14 is a cross sectional view showing a conventional construction of a stator assembly.
Figure 15:
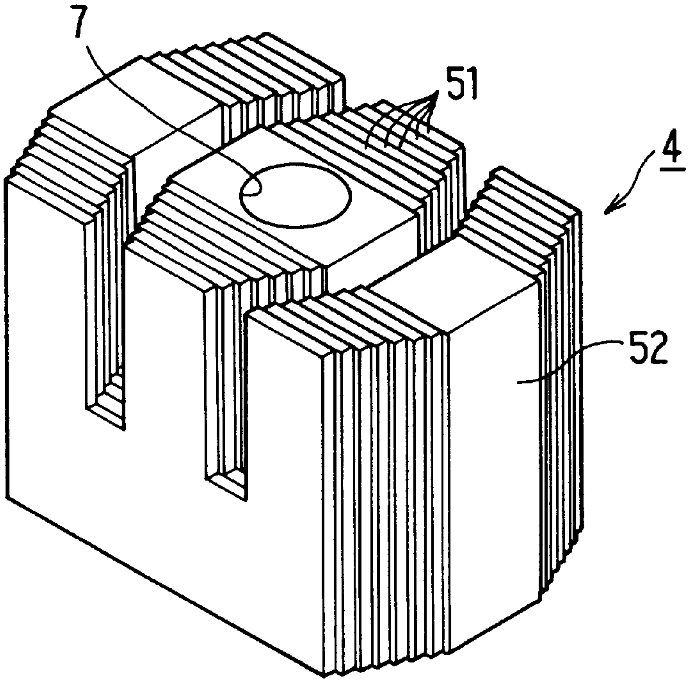
FIG. 15 PRIOR ART
FIG. 15 is a cross sectional view showing another conventional construction of a stator.
Figure 16A:
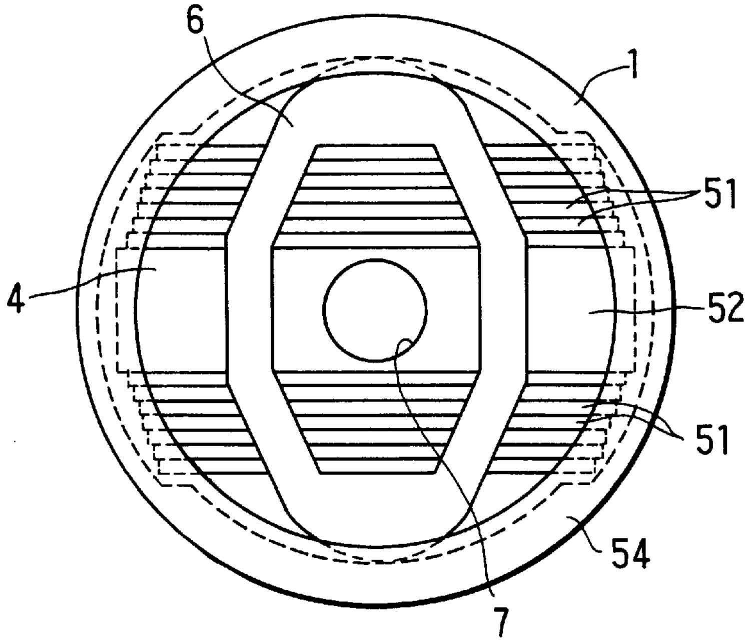
FIG. 16(a) PRIOR ART
FIGS. 16(*a*) and 16(*b*) are a plan view and a cross sectional view showing the another conventional construction of the stator assembly shown in FIG. 15.
Figure 16B:
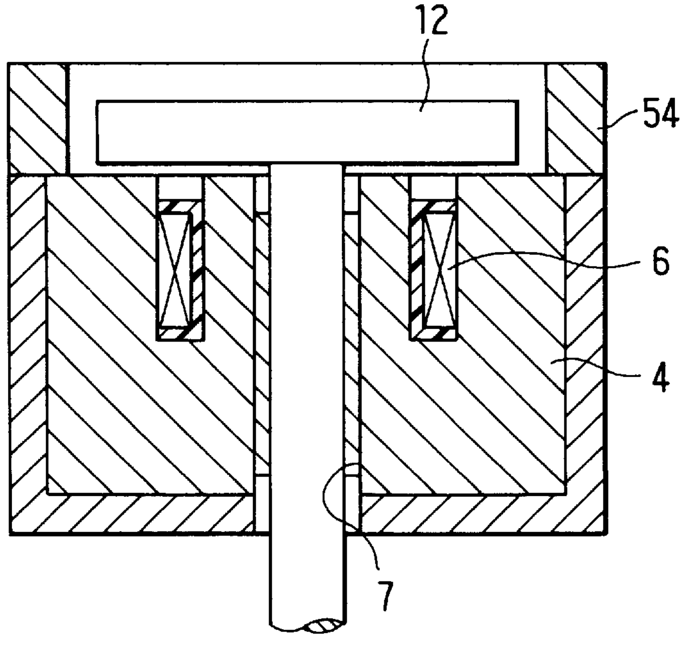
FIG. 16(b) PRIOR ART

In FIG. 13, the electromagnetic device 1 is constructed as a normally open valve for fuel injection. The stator assembly 3 which is in spirally stacked construction as in the foregoing embodiments is disposed in the solenoid housing 2. That is, the stator assembly 3 is constructed generally by the stator 4 comprising a number of magnetic plates and having the through hole 4*a* at the radial center and by the ring 9 fitted around the outer periphery of the stator 4. The coil 6 is wound in the annular groove 6 of the stator 4. The support body 10 is mounted as the first position regulating member on the upperside of the stator 4 and has the disk-like base part 10*a* abutting the stator top end and a cylindrical body 10*b* inserted into the through hole 4*a* of the stator 4. The bottom end of the cylindrical body 10*b* is welded by the laser welding as indicated by W to all the spirally stacked magnetic plates of the stator 4. The bottom peripheral part of the stator 4 is position-regulated by a ring 13*a* as the second position regulating member.

On the other hand, the armature 12 is disposed underside the stator 4 to face the magnetic pole face of the stator 4 and is attached at the central part thereof with the push rod 11 which extends downwardly from the armature 12 through the valve housing 18. A male thread 82*a* is formed on the lower side of the push rod 11 and a nut member 84 is threaded thereon. The valve body 19 is disposed to pass through the push rod 11 and is biased downwardly in the figure by the biasing force of the compression coil spring 23 through a spring bracket 86.

Accordingly, with the coil 6 being deenergized, the valve body 19 is maintained at the position shown in the figure to maintain the communication between the fuel inlet side passage 22*b* and the fuel outlet side passage 22*a*. with the coil 6 being energized, on the contrary, the armature 12 is attracted by the stator 4 to pull the push rod 11 upward in the figure so that the valve body 19 is pulled upwardly in the figure against the biasing force of the compression coil spring 23. Thus, the fuel inlet side passage 22*b* and the outlet side passage 22*a* are closed.

According to this embodiment also, because the position of the stator 4 is regulated in the stator axial direction at both the central part and the outer peripheral part, the similar advantages are provided as in each of the foregoing embodiments. Thus, no such drawbacks such as the rising and displacement of the stator 4 (magnetic plates) occur.

The present invention may be embodied as follows in addition to the foregoing embodiments.

(1) Although the support body 10 or the like is welded to the stator 4 by the laser-welding, these parts may be joined alternatively by arc welding or brazing. As long as the positions of the central part and the outer peripheral part of the stator are regulated, any other joint construction may be adopted.

(2) Although the electromagnetic device 1 is applied to the normally open type electromagnetic valve, it may be applied to other devices.

What is claimed is:

1. An electromagnetic device comprising:

a plurality of magnetic plates stacked spirally to form a cylindrical stator, the magnetic plates having radially inner ends and radially outer ends, the cylindrical stator having a central hole extending in an axial direction at a radial center of the stator;

a coil mounted on the stator;

an armature disposed adjacently to one axial end of the stator with an axial spacing relative to the one axial end of the stator and held movably toward the one axial end of the stator when the coil is energized, the armature being positioned coaxially with the stator and being smaller in diameter than the stator;

a support body having a disk part and a central part extending axially from a radial center of the disk part, the disk part being in abutment with another axial end of the stator, and the central part being fitted in the central hole of the stator and welded to the radially inner ends of the magnetic plates thereby to fix the radially inner ends of the magnetic plates to the support body; and a ring disposed near the armature and in abutment with the radially outer ends of the magnetic plates on the one axial end of the stator, thereby pressing the radially outer ends of the magnetic plates toward the disk part of the support body and regulating the axial spacing of the armature relative to the one axial end of the stator, wherein:

the radially inner ends of the magnetic plates are welded to only an axial end of the central part of the support body.

2. An electromagnetic device according to claim 1, wherein:

said ring is located only at a radially outermost part of the stator.

3. An electromagnetic device according to claim 1, wherein:

the first position regulating member has a base extending radially outwardly from a central part and said disk part of said support body contacting all of the ends of the magnetic plates on a side opposite from the armature.

4. An electromagnetic device according to claim 1, wherein:

the central part of the support body is shorter in axial length than the magnetic plates so that an axial end of the central part is located axially inside the one axial end of the stator with respect to the disk part of the support body.

5. An electromagnetic device according to claim 1, further comprising:

a cylindrical housing accommodating the stator, the support body and the ring fixedly therein;

a valve housing fixed to the cylindrical housing and pressing the ring toward the stator; and a valve member connected to the armature and extending axially away from the support body through the valve housing.

6. An electromagnetic device according to claim 1 wherein:

the magnetic plates are welded to the central part of the support body at a position close to the armature.

7. An electromagnetic device comprising:

a plurality of magnetic plates stacked spirally to form a cylindrical stator having a central hole extending in an axial direction at a radial center of the stator;

a coil mounted on the stator;

an armature disposed adjacently to one axial end of the stator with an axial spacing relative to the one axial end of the stator and held movably toward the one axial end of the stator when the coil is energized, the armature being positioned coaxially with the stator and being smaller in diameter than the stator, and a support body having a disk part and a central part extending axially from a radial center of the disk part, the disk part being in abutment with another axial end of the stator, the central part being fitted in the central hole of the stator and shorter in axial length than the magnetic plates so that an axial end of the central part is located axially inside the one axial end of the stator with respect to the disk part, and the axial end of the central part being welded to radially inner ends of the magnetic plates thereby to fix the radially inner ends of the magnetic plates to the support body, wherein the radially inner ends of the magnetic plates are welded to only an axial end of the central part of the support body, and the central part of the support body is shorter in axial length than the magnetic plates so that an axial end of the central part is located axially inside the one axial end of the stator with respect to the disk part of the support body.

8. An electromagnetic device according to claim 7, further comprising:

a ring member disposed around the armature and in abutment with radially outer ends of the magnetic plates, thereby pressing the radially outer ends of the magnetic plates toward the disk part.

* * * * *